Patented Sept. 3, 1940

2,213,921

UNITED STATES PATENT OFFICE 2,213,921

DIALKYL ETHERS OF DIMETHYLOL UREA AND PROCESS FOR MAKING SAME

Ben E. Sorenson, Upper Darby, Pa., assignor to E. I. du Pont de Nemours & Company, Wilmington, Del., a corporation of Delaware No Drawing. Application October 5, 1938, Serial No. 233,508

7 Claims. (Cl. 260—553)

This invention relates to urea derivatives and more particularly to higher dialkyl ethers of dimethylol urea and the method of preparing such ethers.

The preparation of the lower alkyl ethers of methylol ureas by various methods, has been described elsewhere. The preparation of such lower alkyl ethers is in most instances relatively simple and essentially comprises reacting methylol urea with an alcohol usually in the presence of a catalyst. However, such a procedure is not directly applicable to the preparation of the higher alkyl ethers of methylol ureas since the expected reaction does not take place to any appreciable extent. Since the higher alkyl ethers are of value for certain uses and since they cannot be prepared by the known procedures, a satisfactory method of preparation is highly desirable.

This invention has as an object a method for preparing the higher alkyl ethers of methylol ureas which is simple, efficient and economical. A further object is the preparation of new and useful diethers of dimethylol urea.

These and other objects which will be apparent as the description of the invention proceeds are, in the preferred embodiment of the invention, accomplished by reacting in acid, neutral, or basic medium a dialkyl ether of dimethylol urea with an alcohol containing a larger number of carbon atoms than contained in either of the alcohol radicals of the ether, and then removing the liberated lower alcohol by distillation.

The following examples are illustrative of the method used in practicing my invention:

EXAMPLE I

|  | Grams |
| --- | --- |
| Dimethylol urea dimethyl ether | 296 (2 mols) |
| Normal butyl alcohol | 888 (12 mols) |
| Benzol | 400 |

The above materials were charged into a three-liter flask suitably connected with an effective fractionating column which could be arranged for use as total reflux. The contents of the flask were heated and the methanol-benzol binary boiling at 58° C. was removed as it was freed in the ether interchange reaction. The reaction was carried out for approximately five hours after which time 131 grams had distilled from the reaction mixture in the flask. The methyl alcohol was readily determined by shaking the benzol-methyl alcohol binary distillate with a definite amount of water and noting the change in volume of the original benzol-methyl alcohol mixture. The solution of the ether remaining in the flask was filtered hot to remove any foreign matter that might be present. To obtain the newly formed di-n-butyl ether in crystalline form the filtered solution was chilled to approximately 20° C. and the separated crystals removed by filtration. Three crops of crystals were obtained by repeated chilling with a total yield of 301 grams of the di-n-butyl ether of dimethylol urea. This is a yield of 65% based on the amount of dimethyl ether used. The product obtained had a melting point of 89°–93° C. Since pure di-n-butyl ether of methylol urea has a melting point of 93° C., the product obtained was slightly contaminated and could be further purified by recrystallization.

EXAMPLE II

*Dimethylol urea di-normal decyl ether*

|  | Grams |
| --- | --- |
| Dimethylol urea dimethyl ether | 296.00 (2 mols) |
| Normal decyl alcohol | 948.00 (6 mols) |
| Benzol | 800.00 |
| Metallic sodium | 0.25 |

The materials were charged into the flask equipped as described under Example I. The mixture was heated and the methyl alcohol resulting from the ether interchange was removed in the benzol-methyl alcohol binary. The methyl alcohol obtained by distillation amounted to 129 grams as compared to 128 grams for theoretical complete interchange. After the distillation was completed, which required approximately five hours, the solution in the flask was filtered hot and on cooling, crystals separated. These crystals were removed from the solution and recrystallized two times from isopropyl alcohol. The recrystallized material yielded a melting point of 99°–100° C. Analysis showed the material to contain 7.28% nitrogen. Calculated for dimethylol urea di-n-decyl ether 7.00%.

EXAMPLE III

*Dimethylol urea dilauryl ether*

|  | Grams |
| --- | --- |
| Dimethylol urea dimethyl ether | 55.5 (0.37 mol) |
| Dodecyl alcohol (commercial) | 418.0 (2.2 mols) |
| Benzol | 150.0 |
| Phthalic anhydride | 0.056 |

The above materials were reacted by heating and distilling off the binary mixture of methyl alcohol and benzol as described under Example I. Seventy-five (75) cc. of the methyl alcohol-benzol binary were distilled off and this contained 18 grams of methyl alcohol. The theoretical methyl alcohol for a complete reaction would be approximately 24 grams. The reaction was carried out for approximately 2.5 hours.

After the reaction was completed the solution was filtered hot and on cooling the di-dodecyl ether precipitated from solution as a waxy solid. The waxy solid was separated from the liquid (lauryl alcohol and benzol) by filtration and after being broken into small pieces was thoroughly stirred with acetone. The diether was then separated from the acetone by filtration and dried. The dried material amounted to 100 grams or 60% of the theoretical, based on the dimethylol urea dimethyl ether used.

The diether as obtained above was recrystallized from isopropyl alcohol and the recrystallized material yielded a melting point of 84°–88° C. The material contained 6.6% nitrogen. The theoretical nitrogen content of the dilauryl ether of dimethylol urea is 6.14%.

EXAMPLE IV

*Dimethylol urea di-secondary hexyl ether*

| | Grams | |
|---|---|---|
| Diethylol urea dimethyl ether | 99 | (0.67 mol) |
| Secondary hexyl alcohol (commercial) | 408 | (4.0 mols) |
| Benzol | 133 | |
| Phthalic anhydride | 0.1 | |

The materials were reacted by heating and distilling off the binary mixture of methyl alcohol and benzol as described in Example I. Forty (40) grams of methyl alcohol of reaction were distilled off, the theoretical methyl alcohol for a complete ether interchange being 43.0 grams. After completion of the reaction the mixture was filtered and the filtrate evaporated to dryness in shallow pans at room temperature. The crude crystalline residue was then dissolved in methyl alcohol, filtered and then chilled to between minus 10° and minus 20° C. to reprecipitate the dimethylol urea di-secondary hexyl ether. The ether yielded a melting point of 80°–84° C. Analysis showed a nitrogen content of 10.24%. Theoretical nitrogen content for dimethylol urea disecondary hexyl ether is 9.73%.

The reaction of the ether interchange may be carried out in neutral, acid or basic solution, although reaction in a slightly acid medium is preferred. An acidity of the order as may be developed by approximately 0.1% of phthalic anhydride (based on the lower alkyl ether used) is most desirable. Other acids or acid-forming materials such as may produce an acidity equivalent to the above may be used.

While the use of benzol is noted in the examples, homologs thereof as toluol and xylol may be used, or other hydrocarbons which may assist in the removal of the lower alcohol at a relatively low temperature. The use of the hydrocarbon may be dispensed with provided the temperature is maintained low enough in order to avoid resinification of the new ether formed. Any means by which the temperature may be kept low enough to prevent further reaction of the newly formed ether and by which the alcohol may be conveniently removed, may be used.

The diethyl ether may be used in place of the dimethyl ether, and either of these ethers in which the alkyl radical contains less than 3 carbon atoms is preferable to higher alkyl diethers since they can be prepared relatively easily in quantitative yields. Difficulty in preparing the dialkyl ethers directly begins with those containing 6 carbon atoms in each alkyl radical. The use of the alkyl diethers containing less than 6 carbon atoms in each alkyl radical is, therefore, preferred. For reasons previously noted and for other obvious reasons, the use of the dimethyl or diethyl ether is most desirable.

The lower alkyl ethers of dimethylol urea may be prepared according to the procedures described in my copending applications Serial Numbers 180,454 and 180,456, filed December 17, 1937, or by other suitable means. A convenient procedure comprises reacting water-wet dimethylol urea with a monohydric alcohol in the presence of an acid catalyst and neutralizing the acid catalyst after the reaction has been substantially completed. The crystalline diether of dimethylol urea may then be obtained by concentrating the solution, chilling if necessary, and allowing the crystals to separate. The crystals may be washed or dried in the usual manner. If desired, the concentrated solution may be used in place of the crystalline material.

Aryl diethers may be prepared by the ether interchange of a lower dialkyl ether and an aryl hydroxy compound as benzyl alcohol, phenol, cresylic acid, etc., but in such instances the aryl diether formed is not easily obtained in crystalline or solid form. However, the aryl diether is present in solution and may be satisfactorily used in this form.

It will be apparent, therefore, that in the present process a dialkyl ether of dimethylol urea is reacted with a hydroxylated compound of the formula ROH, in which R is an alkyl or aryl radical. This invention has made possible the preparation of new dialkyl ethers of dimethylol urea, as exemplified in Examples II, III and IV, in which the alkyl radicals contain at least 6 carbon atoms. The process described herein may be applied by reacting a mixed ether of dimethylol urea in which the hydrocarbon ether radicals are alkyl and aryl or different alkyl radicals with the mentioned hydroxylated compound in which R has a greater number of carbon atoms than contained in one of the hydrocarbon radicals of the initial diether of dimethylol urea. Thus, it is possible to prepare new compounds of the formula

R—O—CH$_2$NHCONHCH$_2$—O—R' in which R and R' are alkyl or aryl hydrocarbon radicals at least one of which has at least 6 carbon atoms.

The products of the present invention may be used in the solution as prepared as the vehicle for the preparation of pigmented or non-pigmented coating compositions to be applied to rigid or non-rigid surfaces to produce decorative and protective films on such surfaces. Where the crystalline or solid materials are obtained, they may be redissolved in suitable solvents and used as the vehicle or may be heated under a reflux so as to retain the alcohol liberated and thus produce a resin solution which may be used as the vehicle in preparing coating compositions. Such a procedure is described in my copending application Serial Number 180,455, filed December 17, 1937. Various plasticizers and/or modifiers may be used in preparing the coating compositions to impart certain desirable or necessary properties thereto. The choice of such plasticizers and modifiers will be largely governed by the properties desired and will be apparent to those skilled in the art. The diether solutions are also particularly well adapted for use as impregnating agents for such materials as wood, fiber board, paper, leather, felted products, woven fabrics, etc. Materials coated or impregnated as described may be subjected to elevated temperatures to resinify the diether constituent of the compositions. Other uses of the products of the invention will be readily apparent to those skilled in the art.

As many apparently widely different embodiments of this invention may be made without departing from the spirit and scope thereof, it is to be understood that I do not limit myself to the specific embodiments thereof except as defined in the appended claims.

I claim:

1. A process for making diethers of dimethylol urea which comprises reacting a dialkyl ether of dimethylol urea in which each of the alkyl radicals has less than six carbon atoms with a compound of the formula ROH which has a larger number of carbon atoms than said ether and in which R is a group of the class consisting of alkyl and aryl radicals of the benzene series, and removing during the reaction the liberated alcohol.

2. A process for making dialkyl ethers of dimethylol urea which comprises reacting a dialkyl ether of dimethylol urea in which each of the alkyl radicals has less than six carbon atoms with an alcohol containing a larger number of carbon atoms than contained in at least one of the alcohol radicals of the ether, and removing during the reaction the liberated alcohol.

3. A process for making dialkyl ethers of dimethylol urea which comprises reacting a dialkyl ether of dimethylol urea in which each of the alkyl radicals has less than six carbon atoms with an alcohol containing at least six carbon atoms.

4. A dialkyl ether of dimethylol urea in which at least one of the alkyl radicals contains at least six carbon atoms.

5. Di-normal decyl ether of dimethylol urea.

6. Di-dodecyl ether of dimethylol urea.

7. Di-secondary hexyl ether of dimethylol urea.

BEN E. SORENSON.